United States Patent
Priefert

(10) Patent No.: US 7,121,529 B2
(45) Date of Patent: Oct. 17, 2006

(54) FENCE PANEL INCLUDING A CONNECTOR SYSTEM FOR INTERCONNECTING MULTIPLE PANELS

(75) Inventor: William Dean Priefert, Mt. Pleasant, TX (US)

(73) Assignee: Priefert Mfg. Co., Inc., Mt. Pleasant, TX (US)

( * ) Notice: Subject to any disclaimer, the term of this patent is extended or adjusted under 35 U.S.C. 154(b) by 136 days.

(21) Appl. No.: 10/742,082

(22) Filed: Dec. 19, 2003

(65) Prior Publication Data

US 2004/0155232 A1 Aug. 12, 2004

Related U.S. Application Data

(60) Provisional application No. 60/434,928, filed on Dec. 19, 2002.

(51) Int. Cl.
*E04H 17/16* (2006.01)

(52) U.S. Cl. .................. 256/24; 256/26; 256/30; 256/65.01; 256/68

(58) Field of Classification Search .......... 25/24; 256/25, 26, 30, 65.01, 68, 69; 404/6; 403/206–216, 403/103, 102
See application file for complete search history.

(56) References Cited

U.S. PATENT DOCUMENTS

| | | | | | |
|---|---|---|---|---|---|
| 3,204,606 | A | * | 9/1965 | Parr et al. | 119/514 |
| 3,767,167 | A | * | 10/1973 | Rasmussen | 256/26 |
| 4,583,715 | A | * | 4/1986 | Wright | 256/24 |
| 4,646,807 | A | * | 3/1987 | Doublet | 160/135 |
| 4,685,656 | A | * | 8/1987 | Lee et al. | 256/13.1 |
| 4,791,757 | A | * | 12/1988 | Orlando | 49/360 |
| 4,899,991 | A | * | 2/1990 | Brunkan | 256/69 |
| 5,058,863 | A | * | 10/1991 | Maffet | 256/26 |
| 5,099,610 | A | | 3/1992 | Klatt | |
| 5,402,988 | A | * | 4/1995 | Eisele | 256/24 |
| 5,964,548 | A | | 10/1999 | Akins | |

OTHER PUBLICATIONS

"Big Valley Inverted Arches", *Behlen Country*, pp. 20.

* cited by examiner

*Primary Examiner*—Daniel P. Stodola
*Assistant Examiner*—Nahid Amri
(74) *Attorney, Agent, or Firm*—Kent A. Herink; Daniel A. Rosenberg; Emily E. Harris

(57) ABSTRACT

A fence panel that includes a self-contained connector system which can be used to interconnect, in assembling an animal enclosure, up to four of the panels quickly and easily without the need for additional posts, connectors, or other apparatus.

5 Claims, 5 Drawing Sheets

FENCE PANEL INCLUDING A CONNECTOR SYSTEM FOR INTERCONNECTING MULTIPLE PANELS

This application claims priority to U.S. Patent Application Ser. No. 60/434,928, filed Dec. 19, 2002.

BACKGROUND OF THE INVENTION

1. Field of the Invention

The present invention relates to the general field of connecting multiple cattle/horse panels together safely and, more particularly, to such panels that include an apparatus for connecting up to four cattle/horse panels together safely without using a separate special connector or post.

2. Background of the Art

Farm and ranching animals, such as cattle and horses, are often contained in an area by gates or panels that may be either temporary or semi-permanent in style and function. The panels are typically rectangular in structure and have a plurality of horizontal cross bars. The individual panels may be supported by a base member located on the bottom of a vertical post of the panels, allowing the base member to function as a brace to hold the panels upright. The rectangular structure of the panels having the horizontal cross bars for barring animal movement and the base members used for additional stability allow multiple panels to be positioned together and connected so as to form an enclosure to contain cattle or horses.

There are several types of connectors known in that art that have been used to connect the panels together in order to form a barrier for cattle or horses. One technique uses a flexible chain that may be attached by either using a hooking mechanism or welding one end of the chain to one of the panels; the opposite end of the chain is then attached by a hooking mechanism to the other panel(s) in order to hold the panels together. This method often proves difficult for one person to use while attaching panels alone and further may be difficult to use when trying to attach more than two panels to each other. The use of a chain is also problematic due to the extra movement allowed between the panels. When a chain is used as a method of connection the panels may slide around and shift due to the ability of the connector to hold them in position, thus creating a pen that is not able to withstand the forces exerted by the cattle and horses and thus may potentially cause a hoof or leg of an animal to become caught or trapped between shifting panels.

Other connectors use a pin-chain combination in which the chain fastens to a drop pin thus allowing the pin to be easily inserted and removed while not risking dropping or fumbling of the pin. Another connecting mechanisms currently uses a pin system. Both the pin-chain combination and the pin system are impossible to connect three or four panels together by using the connector that is attached to the panel. The user is forced to buy an adapter, use bailing wire, or buy an extra post to allow for the extra connections.

Another form of connecting mechanism claims the ability to connect the panels together on virtually any terrain however, the standard connection only allows hooking one or two male connectors to one female connector and it is foreseeable that varying terrains would make a female-male connection difficult due to the potential uneven surfaces or angles the panels might adjust to. Three-way and four-way corral adapters are available for hooking two female connectors to one male or two female connectors to two male. The use of connectors using a female-male connecting system is again more difficult for one person to use and the necessity of having a special adapter creates connecting problems when the need for a three-way or four-way connection is not anticipated prior to use.

In this way it is desirable that the panels be easily connected, including potentially being connected in multiple connections as well as forming connections on uneven ground, and that the connected panels be strong enough to withstand the pressure and force exerted by the contained animals.

SUMMARY OF THE INVENTION

The invention consists of a fence panel that includes a connector apparatus that can be used to simply and easily connect two, three, or four panels together without the use of any additional posts, connectors, or other apparatus. The fence panels have first end portion on which is mounted one or more pin connector units and a second end portion on which is mounted, in corresponding number and position, one or more connector loops. Two panels may be interconnected first end portion to second end portion by interconnecting the pin connector unit to a corresponding connector loop. A first end portion of a third panel can be interconnected to the first two by interconnecting the pin connector units of the first and third panel. A second end portion of a fourth panel can be interconnected to the other three by interconnection of the pin connector unit of the third panel with the connector loop of the fourth panel.

On object of the present invention is to provide apparatus forming a part of a fence panel by which two, three, or four of the panels may be interconnected without requiring the use of a supplemental post, separate connector or adaptor, or other such apparatus.

Another object of the invention is to provide apparatus for safely, quickly, and easily interconnecting up to four panels to each other.

These and other objects of the present invention will become apparent to those skilled in the art upon reference to the following specification, drawings, and claims.

DETAILED DESCRIPTION OF THE INVENTION

Figure 1:
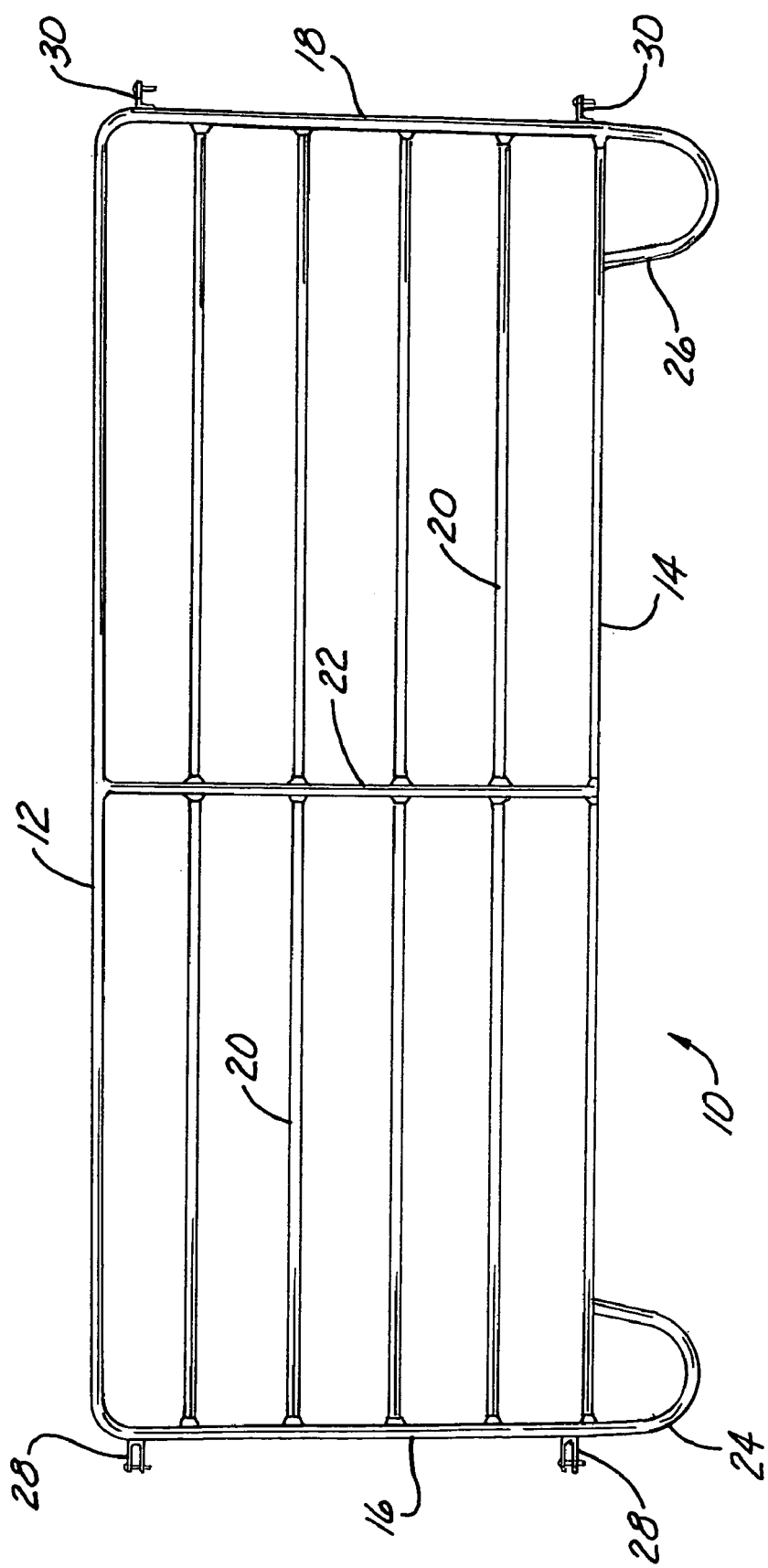
FIG. 1 is a side view of a fence panel of the present invention.

There is illustrated in FIG. 1, generally at 10, a fence panel of the present invention. The generally rectangular panel 10 includes a top rail 12, a bottom rail 14, a first end rail 16, and a second end rail 18. A plurality of parallel, spaced-apart, horizontal rails 20 are attached at opposite end portions to the end rails 16 and 18, and a vertical rail 22 is attached at opposite end portions centrally of the top rail 12 and the bottom rail 14 and is also secured to each of the horizontal rails 20. In a preferred embodiment, the end rails 16 and 18 extend below the bottom rail 14 and curve upwardly to form feet 24 and 26 which support the panel 10 on the ground and ease movement of the panels 10 by a user by providing a pivot point when the opposite end of the panel 10 is elevated.

The panel 10 includes one or more corresponding pairs of connection systems, including a pin connector unit 28 mounted on the first end rail 16 and a connector loop 30 mounted at a corresponding position on the second end rail 18. In the preferred embodiment illustrated in FIG. 1, there are two pair of the connector systems, one mounted near the top rail 12 and the other mounted near the bottom rail 14.

A pin connector unit 28 is illustrated in detail in FIGS. 5*a*–*d*. The pin connector unit 28 includes a U-shaped bracket 32 and a releasable closing member or pin 34. The U-shaped bracket 32 has a pair of aligned pin openings 36*a* and 36*b*, one each in the end portion of each arm of the U-shaped bracket 32, as well as a pair of aligned elongated openings 38*a* and 38*b*, one each in each arm of the U-shaped bracket 32 interiorly of the aligned pin openings 36. The pin 34 has a shaft 40 and an enlarged head 42 and the shaft 40 is received in the openings 36 in the arms of the bracket 32 with the enlarged head 42 being larger than the openings 36 so that it supports the pin 34 across the arms of the bracket 32.

Figure 2:
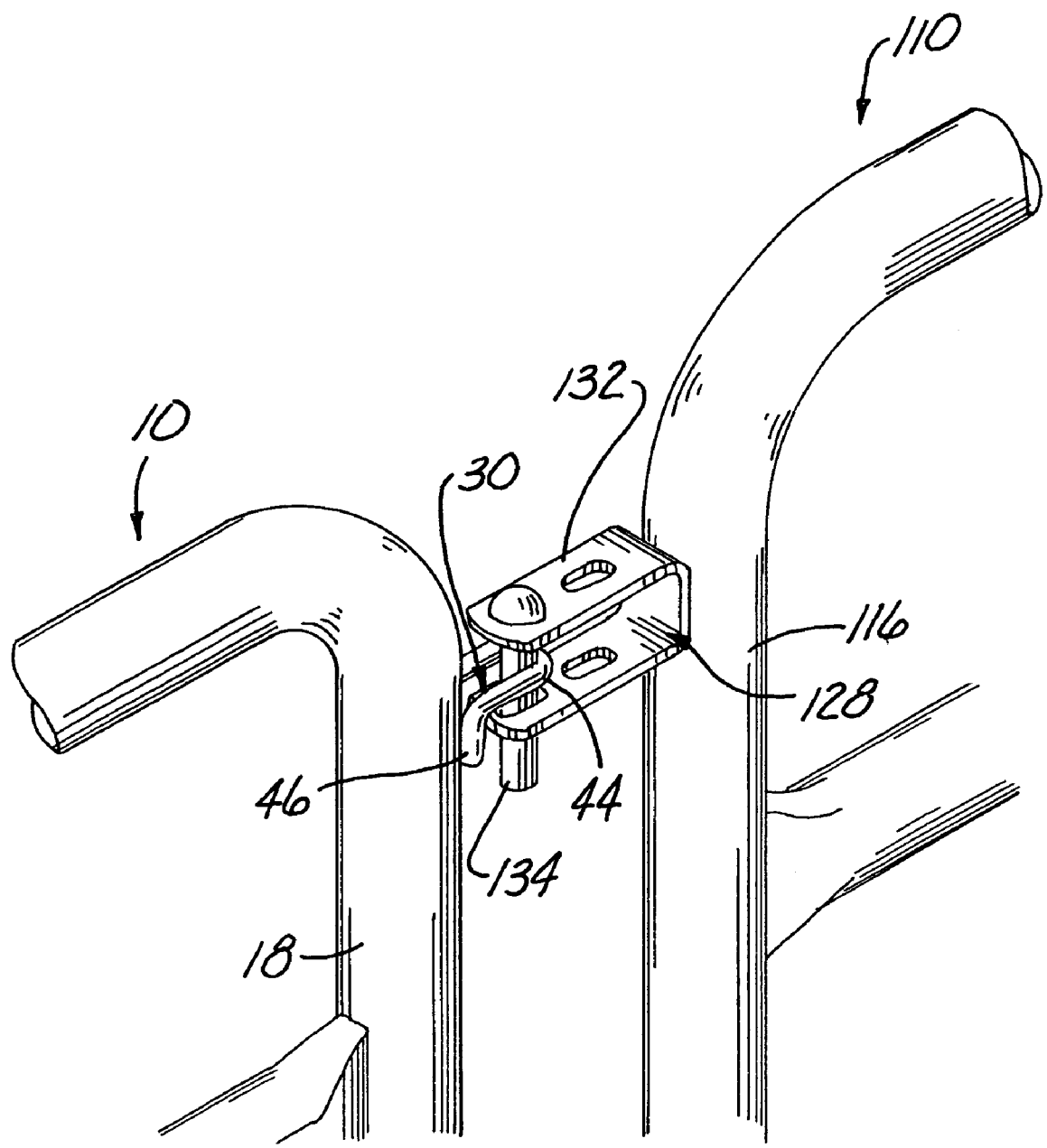
FIG. 2 is an enlarged perspective view of two panels interconnected by apparatus of the present invention.

A connector loop 30 is best illustrated in FIG. 2. It is made of a piece of rod that has been bent to form a U-shaped loop 44 and a pair of downwardly extended support arms 46 that are secured to the second end rail 18 by weldments or the like. A pin connector unit 128 is secured to the first end rail 116 of a second panel 110 by weldments or the like. As illustrated, the two panels 10 and 110 are releasably interconnected to each other by removing the pin 34 from the bracket 132, orienting the panels 10 and 110 so that the opening of the loop 44 is aligned with the pin openings 136 of the bracket 132 and then dropping the pin 134 into the aligned openings and loop thereby capturing the connector loop 30 inside the bracket 132. While only the top connector system is shown, it is to be understood that a user typically will also capture the lower connector loop inside the corresponding lower pin connector unit. Additionally, while the panels 10 and 110 are shown in substantial linear alignment, it is to be understood that the panels can be pivoted relative to each other through a wide angle until the end rail 18 of panel 10 comes into contact with the bracket 132 of the panel 110.

Figure 3:
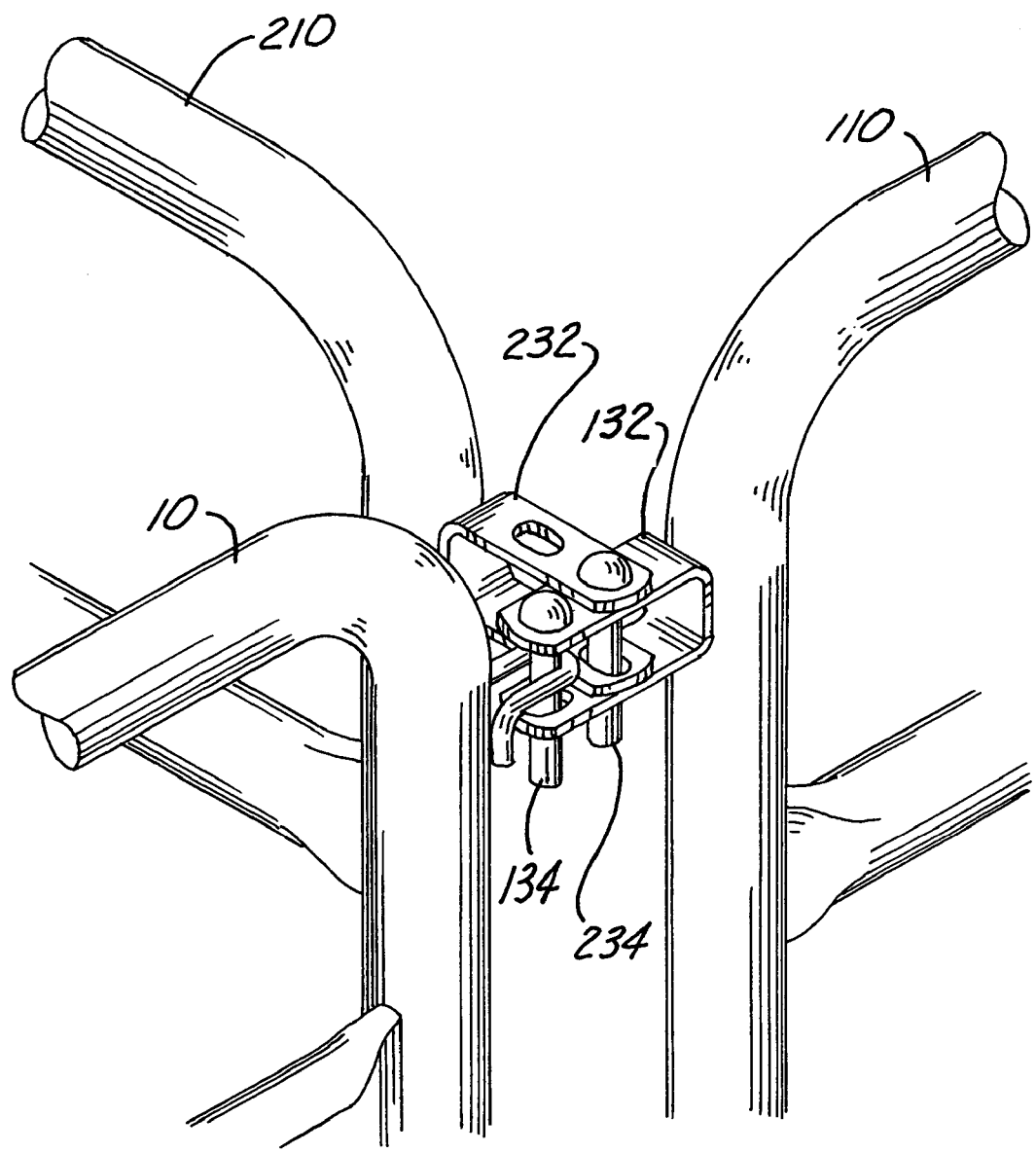
FIG. 3 is an enlarged perspective view of three panels interconnected by apparatus of the present invention.

A third panel 210 can be interconnected to the two panels 10 and 110, as illustrated in FIG. 3. The pin 234 of the third panel 210 is removed from the bracket 232 and the panel 210 is oriented to align the pin openings of the bracket 232 with the elongated openings of the bracket 132. The pin 234 is then dropped into the two pairs of aligned openings to capture the bracket 232 inside the bracket 132. Again, it is expected that typically the user will also similarly interconnect the pin connector units of the two panels 110 and 210 at the lower portions of the two panels. Note also that while the third panel 210 is shown substantially perpendicular to the first two panels 10 and 110, all three may be pivoted relative to each other to a wide range of positions within the limits imposed by the connector systems.

Figure 4:
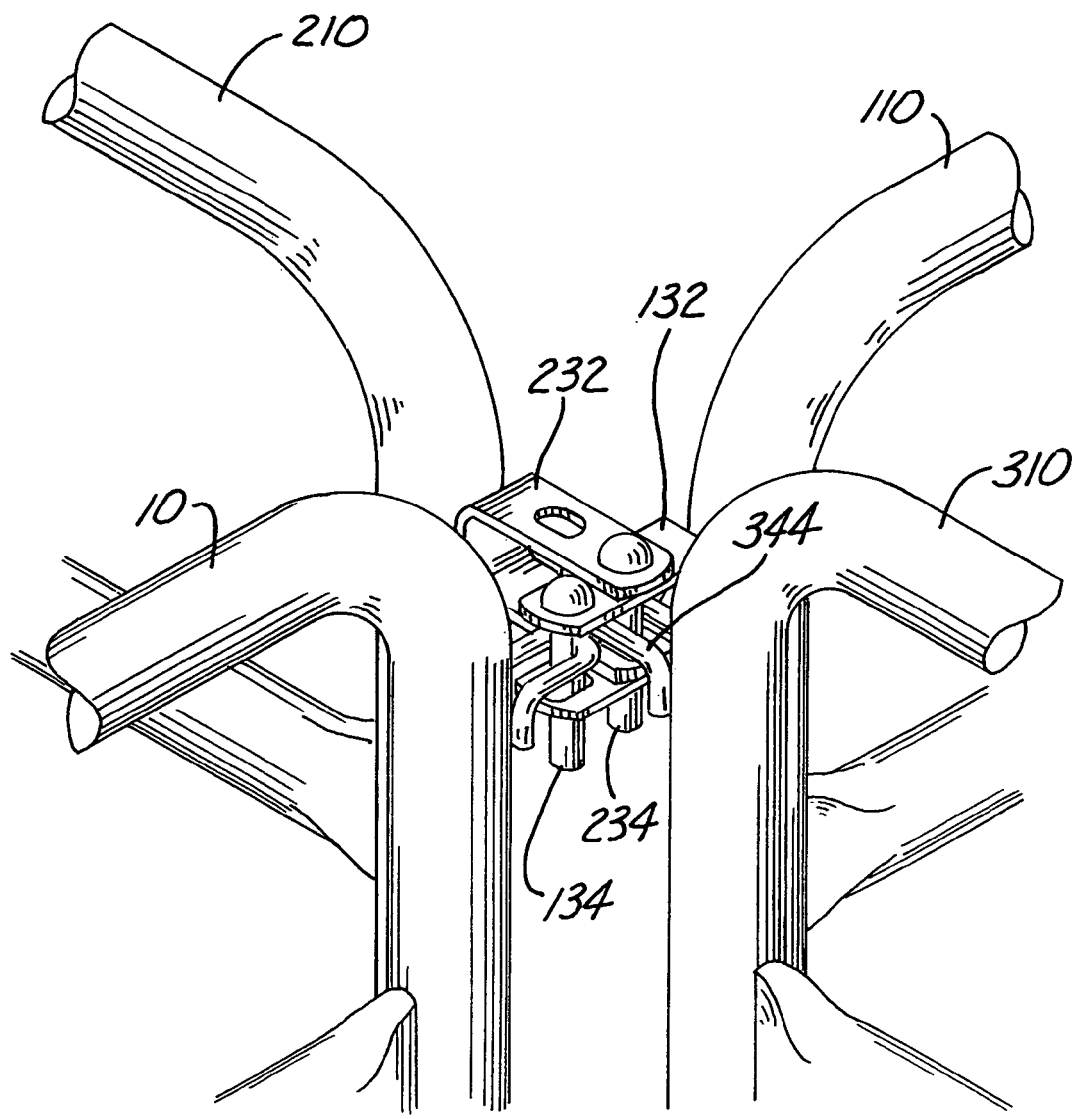
FIG. 4 is an enlarged perspective view of four panels interconnected by apparatus of the present invention.
Figure 5A:
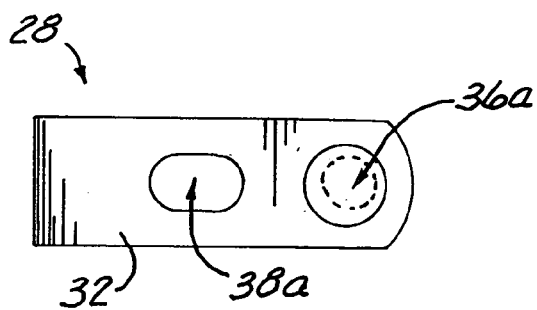
FIGS. 5*a–d* are enlarged top, side, front and perspective views of a pin connector unit of the present invention.
Figure 5D:
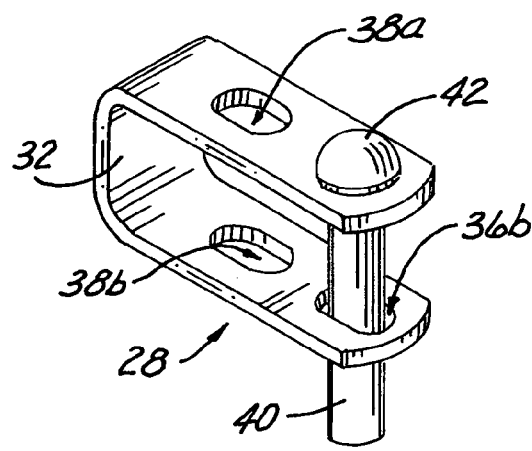
Figure 5B:
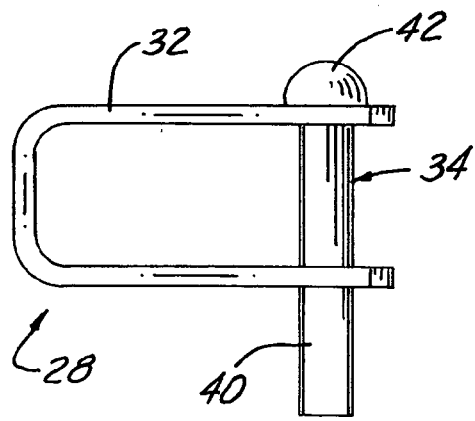
Figure 5C:
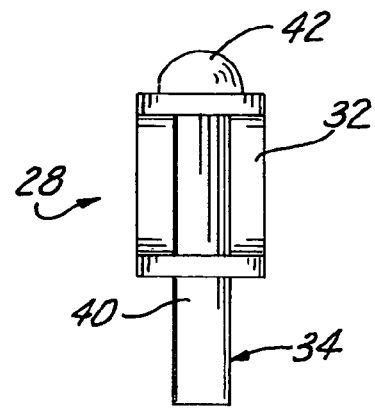

A fourth panel 310 can be interconnected to the three panels 10, 110 and 210, as illustrated in FIG. 4. The pin 234 of the third panel 210 is removed from the bracket 232 and the panel 310 is oriented to align the opening in the loop 344 with the elongated openings of the bracket 132 and the pin openings of the bracket 232. The pin 234 is then dropped into the three pairs of aligned openings to capture the bracket loop 344 inside the brackets 132 and 232. Again, it is expected that typically the user will also similarly interconnect the pin connector units of the three panels 110, 210 and 310 at the lower portions of the panels. Note also that while the fourth panel 310 is shown substantially perpendicular to the other three panels, all four may be pivoted relative to each other to a wide range of positions within the limits imposed by the connector systems.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

I claim:

1. A ground-supported fence panel, comprising:
    (a) a first end portion;
    (b) a U-shaped connector bracket mounted on the first end portion having a pair of arms that define an opening;
    (c) a pin moveable relative to the bracket between a bracket closed position wherein the pin is releasably retained across the bracket arms to close the opening and a bracket open position wherein access to the bracket opening is permitted;
    (d) an opposite, second end portion; and
    (e) a loop mounted on the second end portion at a position raised above the ground corresponding to the position of the connector bracket.

2. A pair of fence panels as defined in claim 1 interconnected, wherein the loop of a first one of the panels is positioned in the bracket of a second one of the panels and retained by the pin in its bracket closed position.

3. A pair of fence panels as defined in claim 1 interconnected, wherein the bracket of a first one of the panels is positioned in the bracket of a second one of the panels and retained therein by at least on of the pins in its bracket closed position.

4. Three fence panels as defined in claim 1 interconnected, wherein the loop of a first one of the panels is positioned in the bracket of a second one of the panels and retained therein by the pin in its bracket closed position and the bracket of a third one of the panels is positioned in the bracket of the second one of the panels and retained therein by at least one of the pins in its bracket closed position.

5. Four fence panels as defined in claim 1 interconnected, wherein the loop of a first one of the panels is positioned in the bracket of a second one of the panels and retained therein by the pin in its bracket closed position, the bracket of a third one of the panels is positioned in the bracket of a second on of the panels and retained therein by at least one of the pins in its bracket closed position, and wherein the loop of a fourth one of the panels is positioned in the bracket of one of the second and third panels and retained therein by the pin in its bracket closed position.

* * * * *